United States Patent
Singh et al.

(10) Patent No.: US 11,585,960 B2
(45) Date of Patent: Feb. 21, 2023

(54) EFFECTIVE AGRICULTURE AND ENVIRONMENT MONITORING

(71) Applicant: International Business Machines Corporation, Armonk, NY (US)

(72) Inventors: Jitendra Singh, Noida (IN); Mukul Tewari, Lafayette, CO (US); Vinayak Sastri, Bangalore (IN); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/702,861

(22) Filed: Dec. 4, 2019

(65) Prior Publication Data

US 2021/0173119 A1 Jun. 10, 2021

(51) Int. Cl.
*G01W 1/00* (2006.01)
*G01W 1/10* (2006.01)
(Continued)

(52) U.S. Cl.
CPC ............ *G01W 1/10* (2013.01); *B64C 39/024* (2013.01); *G05D 1/0027* (2013.01);
(Continued)

(58) Field of Classification Search
CPC .. G01W 1/10; B64C 39/024; B64C 2201/127; G05D 1/0027; G05D 1/0088;
(Continued)

(56) References Cited

U.S. PATENT DOCUMENTS 9,058,633 B2 * 6/2015 Lindores ............... G06Q 50/02
9,523,986 B1 12/2016 Abebe et al.
(Continued)

FOREIGN PATENT DOCUMENTS

CN 208636707 U * 3/2019
KR 101919401 B1 11/2018
(Continued)

OTHER PUBLICATIONS

Shakya, S. et al. Characterising and predicting the movement of clouds using fractional-order optical flow. IET Image Processing, 2019, vol. 13 Iss. 8, pp. 1375-1381, May 29, 2019 [online], [retrieved on Aug. 27, 2022]. Retrieved from the Internet: <URL: https://doi.org/10.1049/iet-ipr.2018.6100> (Year: 2019).*

(Continued)

*Primary Examiner* — Peter D Nolan
*Assistant Examiner* — Peter Y Ning
(74) *Attorney, Agent, or Firm* — Grant Johnson

(57) ABSTRACT

A computer-implemented method for effective agriculture and environment monitoring. The method may comprise measuring a desired variable over an area of interest using a remote inspection platform according to an inspection plan, predicting an occlusion of the remote inspection platform, and in response to the predicted occlusion, determining whether to invoke a local inspection platform to complete the inspection plan. The occlusion in some embodiments interrupts the inspection plan for the remote inspection platform.

20 Claims, 10 Drawing Sheets

(51) Int. Cl.
  *B64C 39/02* (2023.01)
  *G05D 1/00* (2006.01)

(52) U.S. Cl.
  CPC ...... *G05D 1/0088* (2013.01); *B64C 2201/127* (2013.01); *G05D 2201/0201* (2013.01)

(58) Field of Classification Search
  CPC .......... G05D 2201/0201; G05D 1/0094; A01B 79/005
  See application file for complete search history.

(56) References Cited

U.S. PATENT DOCUMENTS

| | | | |
|---|---|---|---|
| 9,773,419 | B1 | 9/2017 | Gordon et al. |
| 9,856,020 | B1 | 1/2018 | Gordon et al. |
| 10,081,437 | B2 | 9/2018 | Jalaldeen et al. |
| 10,212,410 | B2 * | 2/2019 | Liu ................. H04N 13/156 |
| 10,372,987 | B2 | 8/2019 | De Mello Brandao et al. |
| 10,477,756 | B1 * | 11/2019 | Richt ............... A01B 79/005 |
| 2016/0050840 | A1 * | 2/2016 | Sauder ............... G05D 1/0094 701/3 |
| 2017/0083979 | A1 * | 3/2017 | Winn ............... G06Q 20/3224 |
| 2017/0127606 | A1 | 5/2017 | Horton |
| 2017/0158326 | A1 | 6/2017 | Lee et al. |
| 2017/0323235 | A1 | 11/2017 | Johnston et al. |
| 2018/0132423 | A1 * | 5/2018 | Rowan ............... G06Q 10/063 |
| 2018/0262571 | A1 * | 9/2018 | Akhtar ............... G05B 13/0275 |
| 2019/0384283 | A1 * | 12/2019 | Chowdhary ......... G06K 9/6221 |
| 2019/0392596 | A1 * | 12/2019 | Yang ................. G06K 9/6268 |
| 2020/0126232 | A1 * | 4/2020 | Guo .................... G06T 5/50 |
| 2021/0035455 | A1 * | 2/2021 | Hall ................... B64C 39/024 |
| 2021/0110157 | A1 * | 4/2021 | Sinha ................. G06V 10/776 |
| 2021/0182978 | A1 * | 6/2021 | Nissing ............... G06Q 50/02 |
| 2022/0091619 | A1 * | 3/2022 | Wake .................. B64C 27/08 |

FOREIGN PATENT DOCUMENTS

| | | |
|---|---|---|
| WO | 2017014971 A1 | 1/2017 |
| WO | 2018000399 A1 | 4/2018 |

OTHER PUBLICATIONS

Unknown, "Cloud Charts for regions around the World," Weather2, Printed Sep. 10, 2019, 2 pages http://www.myweather2.com/forecastcloud/.

Matese et al., "Intercomparison of UAV, Aircraft and Satellite Remote Sensing Platforms for Precision Viticulture," Remote Sensing, ISSN 2072-4292, Remote Sens. 2015, 7, 2971-2990, 20 pages, doi:10.3390/rs70302971 https://pdfs.semanticscholar.org/3c66/0ed6412425bf68dccedd6f098fcf6c4a5820.pdf.

Mell et al., "The NIST Definition of Cloud Computing," Recommendations of the National Institute of Standards and Technology, U.S. Department of Commerce, Special Publication 800-145, Sep. 2011, 7 pages.

"Yara, IBM to offer digital services to farmers," Reuters, Apr. 26, 2019, 8 pages https://in.reuters.com/article/us-yara-intl-ibm/yara-ibm-to-offer-digital-services-to-farmers-idINKCN1S20GO.

Anderson et al., "Estimated Annual Economic Impacts from Harmful Algal Blooms (HABs) in the United States," Sea Grant Woods Hole, Woods Hole Oceanographic Institution, Sep. 2000, 96 pages https://www.whoi.edu/cms/files/Economics_report_18564_23050.pdf.

Sheehan, "Industry wildfire losses near $20bn in record year for insurers: Aon," Reinsurance News, Jan. 29, 2019, 3 pages https://www.reinsurancene.ws/industry-wildfire-losses-near-20bn-in-record-year-for-insurers-aon/.

Brian B's Climate Blog—A repository for maps and thoughts on the climate of various regions, Mar. 18, 2015, http://us-climate.blogspot.com/2015/03/average-cloudiness.html.

* cited by examiner

EFFECTIVE AGRICULTURE AND ENVIRONMENT MONITORING

BACKGROUND

The present invention relates to agriculture, and more specifically, to an agricultural method and system using a high resolution sensor platform for analyzing and servicing crops.

Agricultural crops are an important source of food. When the crop yield of a given tract of land increases, more of the crop is available for consumption and/or seeding. In addition, when the crop yield increases, the unit cost of the crop may decrease.

Crops may be planted in remote areas and/or in large tracts of land, making inspection of the growth progress of the crops located away from the edge of the tract difficult or costly. Crops may be susceptible to harm by parasites, drought, etc. The cause of potential crop loss may be discovered too late to save the plants in some cases.

SUMMARY

According to one or more embodiments, a method for effective agriculture and environment monitoring. The method may comprise measuring a desired variable over an area of interest using a remote inspection platform according to an inspection plan, predicting an occlusion of the remote inspection platform, and in response to the predicted occlusion, determining whether to invoke a local inspection platform to complete the inspection plan. The occlusion in some embodiments interrupts the inspection plan for the remote inspection platform.

According to one or more embodiments, a base controller for a multi-platform inspection system. The base controller may comprise a processor coupled to a memory. The memory may contain instructions for initiating an inspection plan using data from a remote platform over an area of interest, predicting an occlusion of the remote inspection platform, and in response to the predicted occlusion, automatically deploying local inspection platforms based upon conditions of the occlusion, capabilities of the local inspection platform, and monitoring requirements for the inspection plan. The occlusion in some embodiments may interrupt the inspection plan for the remote inspection platform.

Additional features and advantages are realized through the techniques disclosed herein. Other embodiments and aspects are described in detail herein. Refer to the description below and to the drawings for the various features and aspects disclosed herein.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
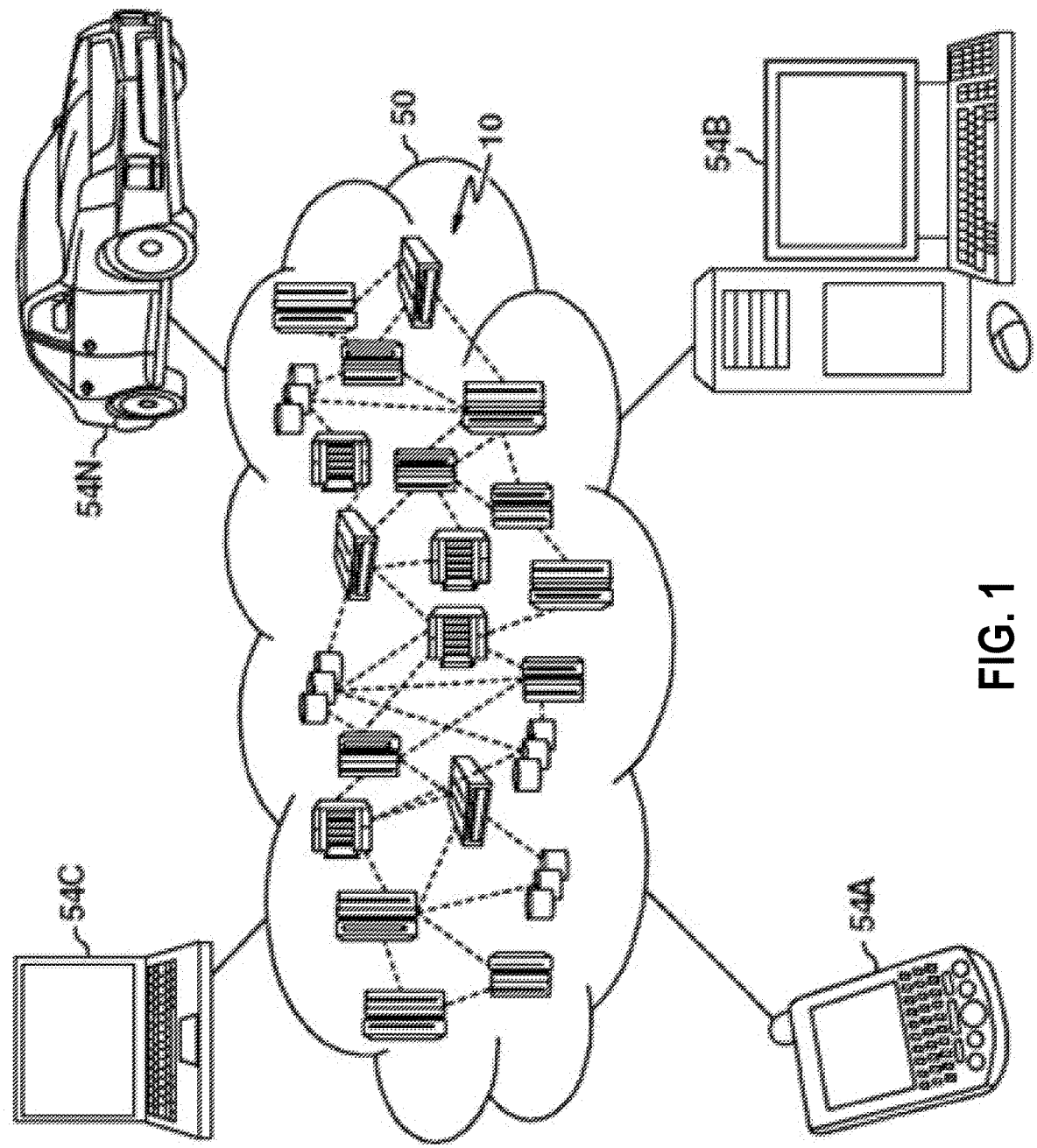
FIG. 1 depicts a cloud computing environment according to some embodiments.

Remote inspection platforms (RI platforms), such as high resolution cameras and/or radar systems deployed on airplanes and/or satellites, have long been a mainstay for agricultural inspection and forecasting. Inspection plans for such RI platforms, however, are often impacted by cloud occlusion/cover. This can be of particular concern when the cloud cover is frequent and/or substantial in duration (e.g., monsoon season), and/or when the occlusion occurs during critical periods for the inspection plan. Accordingly, this disclosure describes a system and associated methods for choosing whether to use an alternate, local inspection platform (LI platform), such as a plurality of aerial autonomous vehicles, to provide supplemental monitoring for agriculture applications (crop type, crop health, crop growth, crop yield, crop pest and diseases, crop damage estimation, crop vandalism, etc.) and environment applications (vegetation, wildfire, floods, landslide, hailstorms, etc.) when remote inspection fails to deliver under cloudy occlusion conditions at a specific time and location. Some embodiments may then invoke those LI platforms, including optimizing their characteristics/specification, numbers, and routes. If chosen favorably, embodiments may also establish context-of-computation between the LI platform and the RI platform for the purpose of monitoring and reporting, and may also hand the control back to the RI platform once the occlusion vanishes.

An Autonomous Vehicle (AV), in turn, generally refers to a vehicle that is capable of performing some functions without human intervention. Examples of flight-related functions may include, but are not limited to, sensing its environment or operating in the air without a need for input from an operator, among others. For instance, some functions could be controlled by a remote human operator, while other functions are carried out autonomously. Further, an AV may be configured to allow a remote operator to take over functions that can otherwise be controlled autonomously by the AV. Yet further, a given type of function may be controlled remotely at one level of abstraction and performed autonomously at another level of abstraction. For example, a remote operator could control high level navigation decisions for an AV, such as by specifying that the AV should travel from one location to another, while the AV's navigation system autonomously controls more fine-grained navigation decisions, such as the specific route to take between the two locations, specific flight controls to achieve the route and avoid obstacles while navigating the route, and so on.

This disclosure also includes systems and associated methods to decide whether to invoke an LI platform by using predicted cloud density and duration conditions over the region of interest for given agricultural and environmental applications (against LI platforms/satellite monitoring); to choose the characteristics of (sensor type/configurations) and number of LI platforms to invoke for a given area; to enable the LI platforms to report and take actions to the consumers of the remote inspection for the period that the LI platforms are active; to re-invoke modules to re-compute whether the cloud cover is sufficiently reduced for remote inspection to restart with sufficient accuracy; to take back data collection (and/or computation) from the LI platform to the RI platform; and finally release the LI platform for repair, refueling, etc.

Some embodiments further provide for pre-loading the LI platforms at the right time, deploying LI platforms such that the pre-loaded info arrives to (loads into) the LI platforms in time, handing over the computation to the LI platforms, atomically, from the remote sensors, and laying a platform to derive streaming intelligence at the backend so that the continuity remains as the data source changes while there is no duplicate effort (e.g., de-duplicating data that would get collected at both the remote sensor and drone due to bad synchronization), and re-transferring the context back to the remote sensor appropriately.

One feature and advantage of some embodiments is that its robust scheduling method allows for effective deployment of LI platforms, such as autonomous vehicles, when the monitoring area is relatively large. That is, some embodiments will make deployment decisions based at least in part on: current and forecasted cloudy conditions (intensity and duration) over the region to be monitored; compute the losses if LI platforms are not deployed in between current and forecasted duration to make an objective decision; the application for which inspection is desired e.g., an agriculture insurance company would do cost optimization by selecting those cropping areas which have high probability of hail damage based on spatial-temporal hail forecast maps; and the need for continuity of the data set for analytics. In this way, some embodiments can reduce the chance of missing data and can avoid duplicate data. This, in turn, allows downstream application semantics to be preserved because of the continuity and non-redundancy of data and processes.

Some embodiments may be used for wide variety of inspection tasks where large scale monitoring is desirable, including for agriculture crop insurance underwriting and adjusting, yield monitoring, algae bloom monitoring, wildfire monitoring, agri-financing, supply chain robustness, weather forecasting, and the like.

Cloud Computing

FIG. 1 illustrates an embodiment of a cloud environment suitable for an edge enabled scalable and dynamic transfer learning mechanism. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
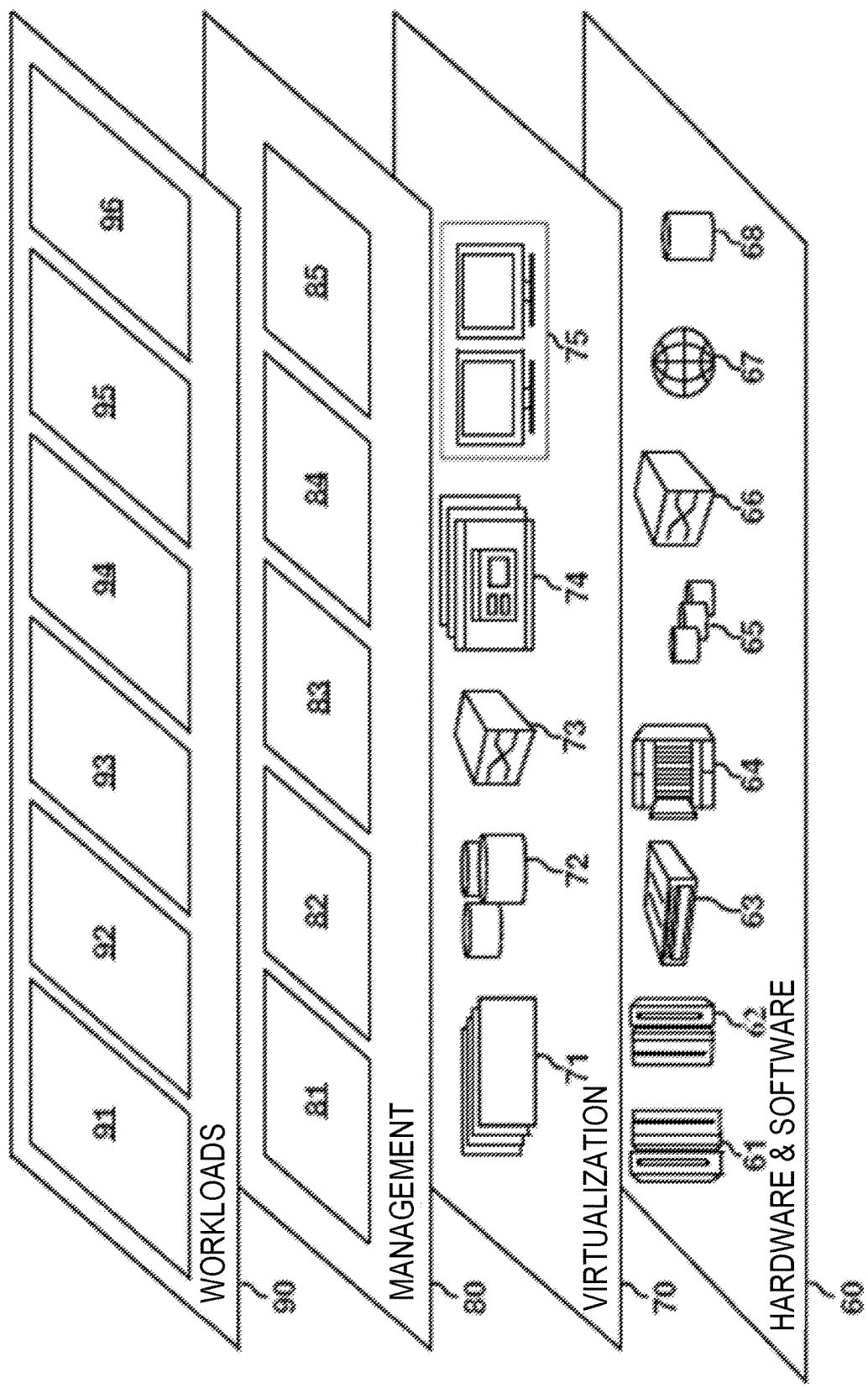
FIG. 2 depicts abstraction model layers according to some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and agricultural monitoring system 96.

Data Processing System

Figure 3:
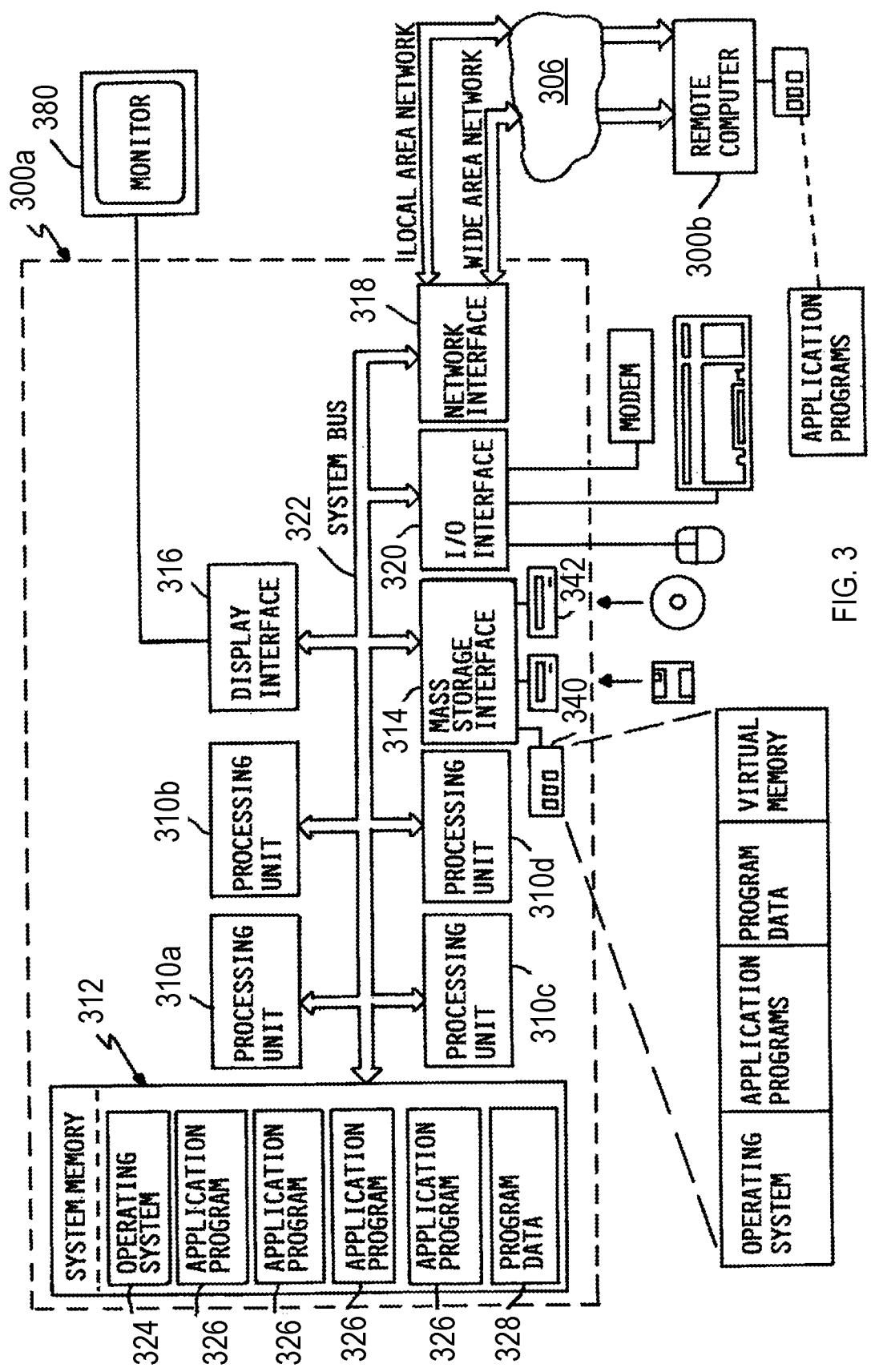
FIG. 3 is a block diagram of a data processing system (DPS) according to one or more embodiments disclosed herein.

FIG. 3 illustrates an embodiment of a data processing system (DPS) 300 suitable for use as a base controller in an agricultural monitoring system 96. In some embodiments, the DPS 300 is implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300 and individual components may have greater complexity than represented in FIG. 3.

The data processing system 300 in FIG. 3 comprises a plurality of central processing units 310 *a*-310 *d* (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 in this embodiment connect the system bus 322 to one or more mass storage devices, such as a direct access storage device 340 or a readable/writable optical disk drive 342. The network interfaces 318 allow the DPS 300 to communicate with other DPS 300 over the communications medium 306. The memory 312 also contains an operating system 324, a plurality of application programs 326, and program data 328.

The data processing system 300 embodiment in FIG. 3 is a general-purpose computing device. Accordingly, the processors 310 may be any device capable of executing program instructions stored in the memory 312 and may themselves be constructed from one or more microprocessors and/or integrated circuits. In this embodiment, the DPS 300 contains multiple processors and/or processing cores, as is typical of larger, more capable computer systems; however, in other embodiments the computing systems 300 may comprise a single processor system and/or a single processor designed to emulate a multiprocessor system. Further, the processors 310 may be implemented using a number of heterogeneous data processing systems 300 in which a main processor is present with secondary processors on a single chip. As another illustrative example, the processor 310 may be a symmetric multiprocessor system containing multiple processors of the same type.

When the data processing system 300 starts up, the associated processor(s) 310 initially execute the program instructions that make up the operating system 324, which manages the physical and logical resources of the DPS 300. These resources include the memory 312, the mass storage interface 314, the terminal/display interface 316, the network interface 318, and the system bus 322. As with the processor(s) 310, some DPS 300 embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer readable program code") may be initially located in the mass storage devices 340, 342, which are in communication with the processors 310 through the system bus 322. The program code in the different embodiments may be embodied on different physical or tangible computer readable media, such as the system unit 312 or the mass storage devices 340, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the computer readable media 342 that is selectively removable and may be loaded onto or transferred to the DPS 300 for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 342 work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function, so that one cache holds instructions while another holds non-instruction data, which is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300 to behave as if it has access to a large, single storage entity instead of access to multiple, smaller storage entities such as the memory 312 and the mass storage device 340, 342.

Although the operating system 324, the application programs 326, and the program data 328 are illustrated as being contained within the memory 312, some or all of them may be physically located on different computer systems and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time, and may even reside in the virtual memory of other DPS 300.

The system interface units 314, 316, 318, 320 support communication with a variety of storage and I/O devices. The mass storage interface 314 supports the attachment of one or more mass storage devices 340, 342, which are typically rotating magnetic disk drive storage devices, a solid-state storage device (SSD) that uses integrated circuit assemblies as memory to store data persistently, typically using flash memory, or a combination of the two. However, the mass storage devices 340, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 is used to directly connect one or more display units, such as monitor 380, to the data processing system 300. These display units 380 may be non-intelligent (i.e., dumb) terminals, such as an LED monitor, or may themselves be fully programmable workstations used to allow IT administrators and users to communicate with the DPS 300. Note, however, that while the display interface 316 is provided to support communication with one or more display units 380, the computer systems 300 does not necessarily require a display unit 380 because all needed interaction with users and other processes may occur via network interface 318.

The communications medium 306 may be any suitable network or combination of networks and may support any appropriate protocol suitable for communication of data and/or code to/from multiple DPS 300. Accordingly, the network interfaces 318 can be any device that facilitates such communication, regardless of whether the network connection is made using present day analog and/or digital techniques or via some networking mechanism of the future. Suitable communication media 306 include, but are not limited to, networks implemented using one or more of the "Infiniband" or IEEE (Institute of Electrical and Electronics Engineers) 802.3x "Ethernet" specifications; cellular transmission networks; wireless networks implemented one of the IFFE 802.11x, IEEE 802.16, General Packet Radio Service ("GPRS"), FRS (Family Radio Service), or Bluetooth specifications; Ultra Wide Band ("UWB") technology, such as that described in FCC 02-48; or the like. Those skilled in the art will appreciate that many different network and transport protocols can be used to implement the communication medium 306. The Transmission Control Protocol/Internet Protocol ("TCP/IP") suite contains suitable network and transport protocols.

Autonomous Vehicle

Figure 4:
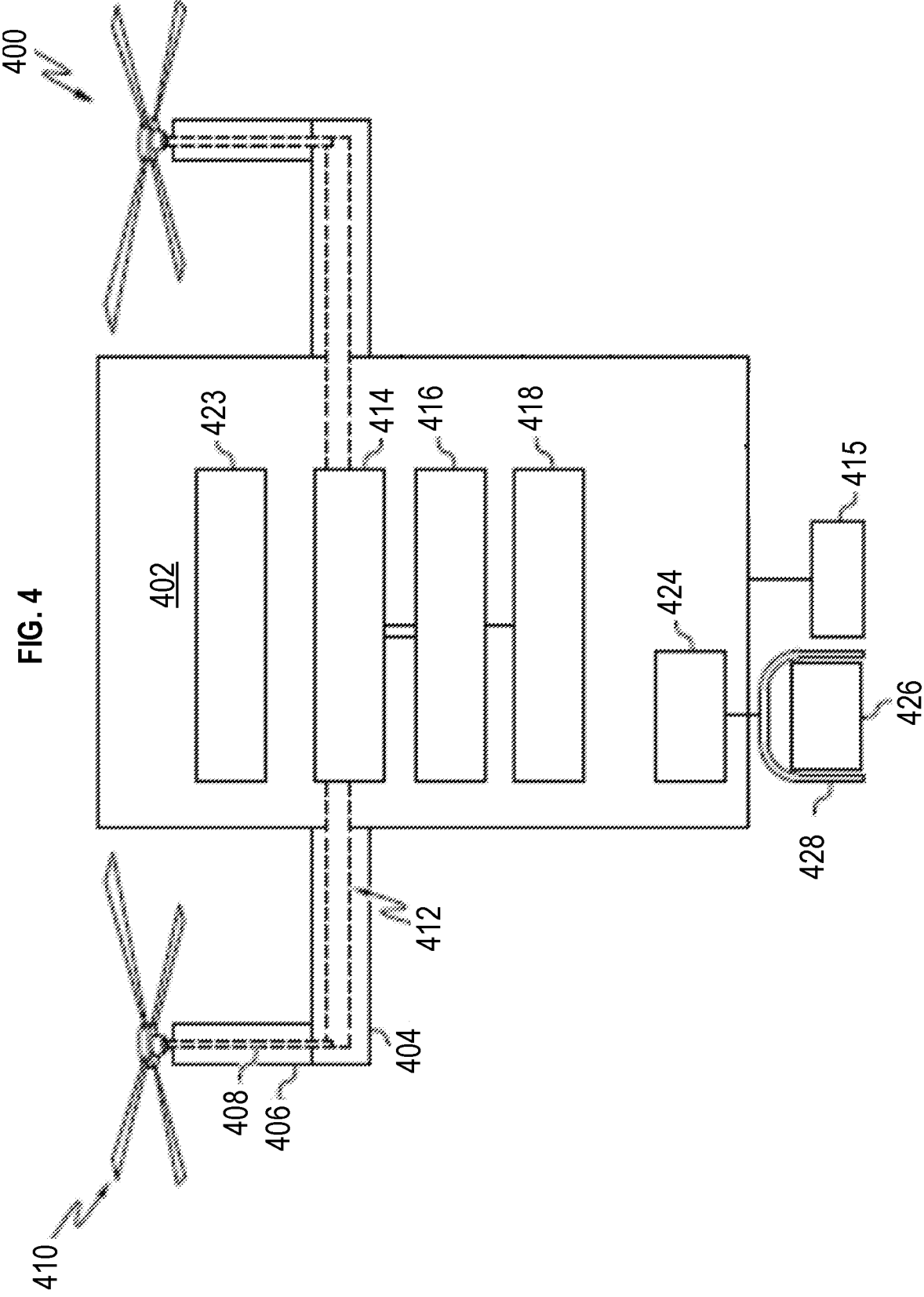
FIG. 4 illustrates an example aerial autonomous vehicle (AV) in accordance with some embodiments.

FIG. 4 illustrates an example aerial AV 400 in accordance with some embodiments. As shown in FIG. 4, the AV 400 includes a body 402, which is attached to supports 404, such as stanchion 406. The stanchions 406, in turn, provide a housing for a driveshaft 408 within each of the stanchions 406. These driveshafts 408 are connected to propellers 410. A power transfer mechanism 412 (e.g., a chain, a primary driveshaft, etc.) transfers power from a geared transmission 414 to the driveshafts within the stanchions (e.g., from geared transmission 414 to the driveshaft 408 inside stanchion 406), such that propeller 410 can be turned to provide lift and steering to the AV 400. Geared transmission 414 may comprise a plurality of gears or a continuously-variable-transmission, such that a gear ratio inside geared transmission 414 can be changed. Power to the geared transmission 414 may provide by a motor 416, such as an electric, internal combustion, or turbine engine. The motor 416, in turn, is connected to a battery or fuel tank 418 appropriate for the type of motor 416.

Affixed inside the bottom of body 402 is a camera controller 424, which is logic that controls movement of a camera 426 via a camera support 428 (which includes actuators, not shown, for movement of camera 426). The camera controller 424 is able to focus, as well as aim camera 426, while under the control of an on-board computer 423. The camera 426, in turn, is capable of sending still or moving visible light digital photographic images (and/or infrared light digital photographic images) to the on-board computer 423. These images can be used to determine the location of the AV 400 (e.g., by matching to known landmarks), to sense other platforms/obstacles, and/or to determine speed (by tracking changes to images passing by), as well as to receive visual images of the objects of the inspection for analysis. Also affixed inside the bottom of body 402 is a plurality of other sensors 415 (only one shown for clarity), such as a hydrometer, thermometer, particulate sensors, multi-spectral cameras, microphones, barometers, chemical sensors, vibration sensors, photometers, accelerometers, barometers, etc. These sensors 415 may also be used to analyze the objects under inspection, to ascertain the environment in which the AV 400 is operating, or a combination of both. While these components are described as being located on or inside the bottom of body 402, in other embodiments alternative locations can be used.

Figure 5:
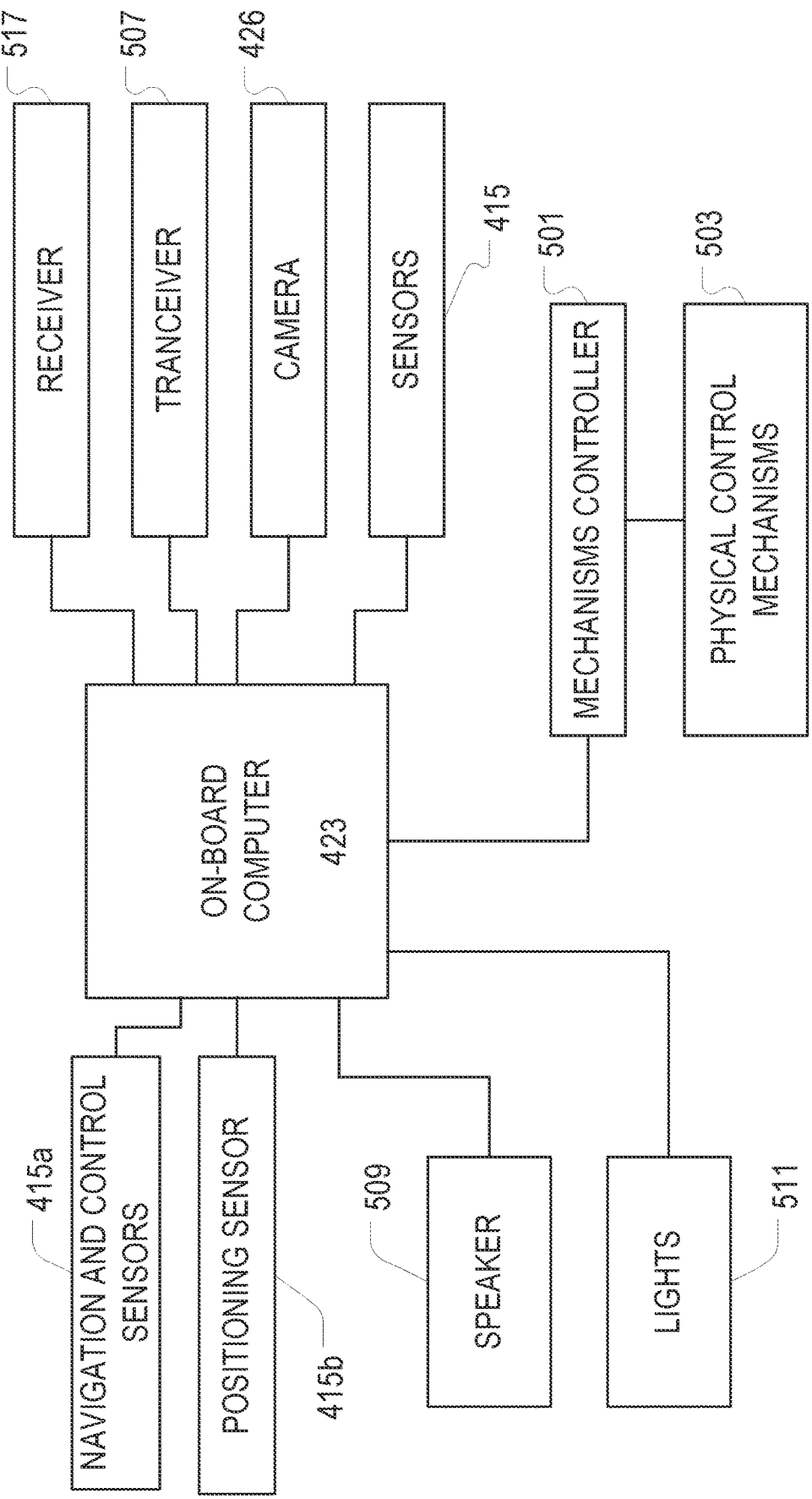
FIG. 5 illustrates example control hardware and other hardware components within some AV embodiments.

Also on AV 400 in one or more embodiments is a speaker 509 and lights 511 (See FIG. 5). Speaker 509 and lights 511 are used by on-board computer 323 to provide aural and visual warnings, alerts, etc. That is, once the AV 400 detects a certain type of error, an aural alert (e.g., an intense warning sound broadcast by speaker 509 on the AV 400) may be sounded, and lights 511 may be flashed, warning persons of the proximity of the AV 400).

While AV 400 is depicted in FIG. 4 as having multiple propellers, in another embodiment a single propeller elevates and adjusts pitch and roll of the AV while a rotor adjusts yaw of the AV using a set of positioning sensors (e.g., gyroscopes) that cause the propeller and rotor to change attitude. Similar positioning sensors can likewise adjust the attitude of multiple propellers.

With reference now to FIG. 5, example control hardware and other hardware components within some AV 400 embodiments are depicted. The on-board computer 423 in this embodiment controls a mechanisms controller 501, which is a computing device that controls a set of platform physical control mechanisms 503, such as throttles for electric motor 416, selectors for selecting gear ratios within the geared transmission 414, controls for adjusting the pitch, roll, and angle of attack of propellers such as propeller 410 and other controls used to control the operation and movement of the AV 400 depicted in FIG. 4.

Whether in autonomous mode or remotely-piloted mode (based on control signals sent from a base station (which may be consistent with DPS 300) to the on-board computer 423 shown in FIG. 4), the on-board computer 423 controls the operation of AV 400. This control includes the use of outputs from navigation and control sensors 415a to control the AV 400. Navigation and control sensors 415a include hardware sensors that (1) determine the location of the AV 400; (2) sense other AVs and/or obstacles and/or physical structures around AV 400; (3) measure the speed and direction of the AV 400; and (4) provide any other inputs needed to safely control the movement of the AV 400.

With respect to the feature of (1), determining the location of the AV 400, this may be achieved in one or more embodiments through the use of a positioning system 415b, which may be a separate device or may be part of the on-board computer 423. Positioning system 415b may use the global positioning system (GPS) network, which uses space-based satellites that provide positioning signals that are triangulated by a GPS receiver to determine a 3-D geophysical position of the AV 400. Positioning system 415b may also include and use, either alone or in conjunction with a GPS system, land-based radio beacons for radio navigation, physical movement sensors such as accelerometers (which measure changes in direction and/or speed by an AV in any direction in any of three dimensions), speedometers (which measure the instantaneous speed of an AV), air-flow meters (which measure the flow of air around an AV), barometers (which measure altitude changes by the AV), etc. Such physical movement sensors may incorporate the use of semiconductor strain gauges, electromechanical gauges that take readings from drivetrain rotations, barometric sensors, etc.

With respect to the feature of (2), sensing other AVs and/or obstacles and/or physical structures around AV 400, the on-board computer 423 may utilize radar or other electromagnetic energy that is emitted from an electromagnetic radiation transmitter 507, bounced off a physical structure (e.g., a building, bridge, another AV, etc.), and then received by an electromagnetic radiation receiver 517. By measuring the time it takes to receive back the emitted electromagnetic radiation, and/or evaluate a Doppler shift (i.e., a change in frequency to the electromagnetic radiation that is caused by the relative movement of the AV 400 to objects being interrogated by the electromagnetic radiation) in the received electromagnetic radiation from when it was transmitted, the presence and location of other physical objects can be ascertained by the on-board computer 423.

With respect to the feature of (3), measuring the speed and direction of the AV 400, this may be accomplished in one or more embodiments by taking readings from an on-board airspeed which may be one of navigation and control sensors 415a on the AV 400 and/or detecting movements to the control mechanisms on the AV 400 and/or the navigation sensors 415a discussed above.

With respect to the feature of (4), providing any other inputs needed to safely control the movement of the AV 400, such inputs include, but are not limited to, control signals to fly the AV 400, to land AV 400 (e.g., to make an emergency landing), etc.

Base Controller Operation

Figure 6:
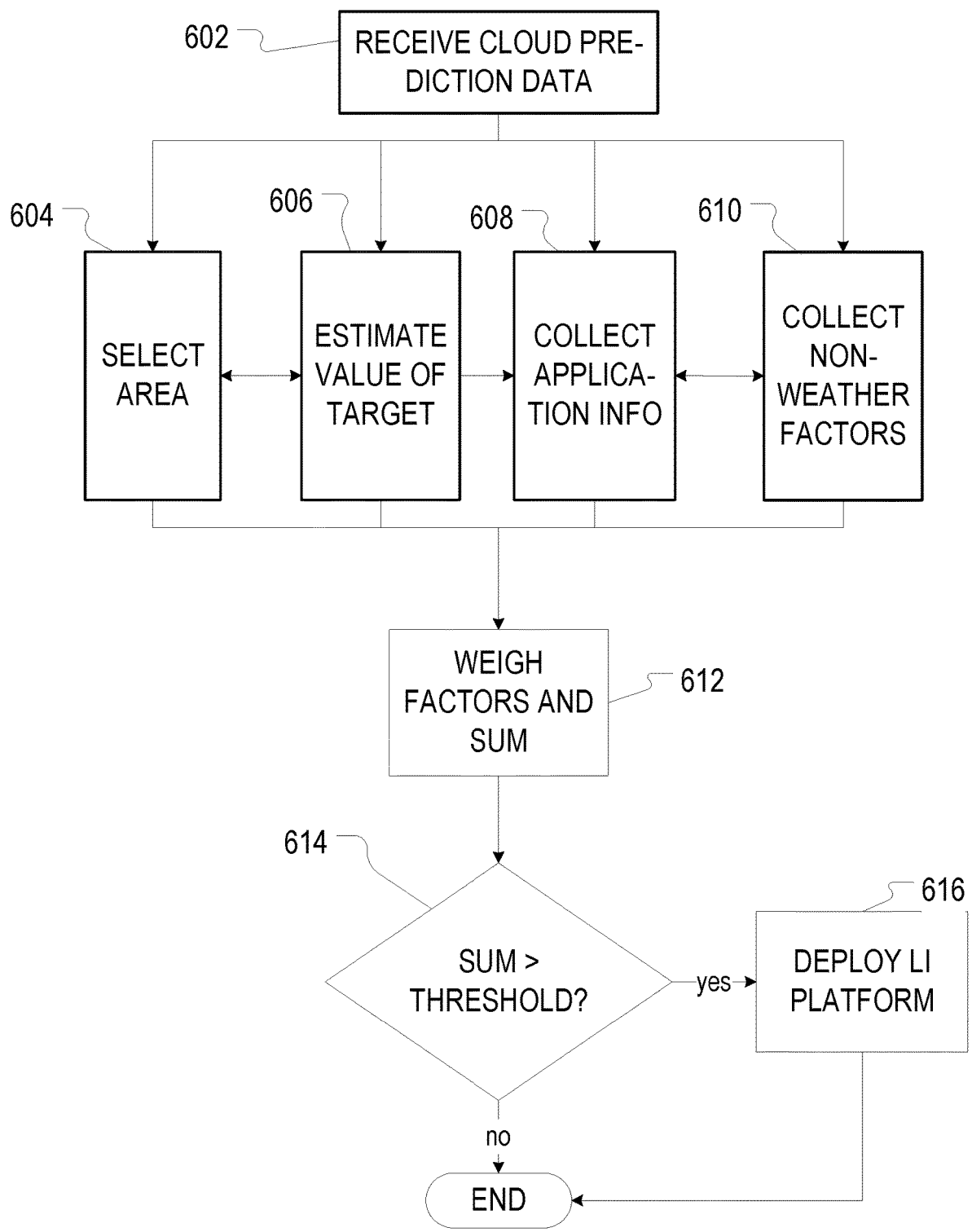
FIG. 6 depicts a method of determining whether to substitute remote inspection with local inspection, consistent with some embodiments.

FIG. 6 depicts a method of determining whether to substitute remote inspection with local inspection using an LI platform, such as AV 400, consistent with some embodiments. At block 602, the base controller (DPS 300) invokes a cloud cover prediction model, such as one of the number of commercial services available. This block may also include obtaining predictions from other high resolution numerical weather prediction (NWP) models available on the Internet and/or data from ground radar systems, sky view cameras, temperature/humidity stations, and the like. The predicted cloud cover density and duration—this leads to an estimate of loss of accuracy (time and quality) of remote inspection if a local monitoring is not invoked.

At block 602, a geographical area(s) and/or sub-area(s) are selected based on the predicted cloud cover over those area(s) (i.e., uniformly or higher than a pre-determined threshold coverage area) per the model output received at block 602. This leads to an estimate of loss of area of monitoring if a local monitoring is not invoked. In some embodiments, different density/type/duration of clouds can be predicted in adjacent areas. In these embodiments, the areas under each combination of cloud density/type/duration is broken up into different geographical sub-areas, and because clouds shifting over time, each sub-area can be seen as a summation of a time-series of cases.

At block 606, the commercial value of the inspection target (e.g., crops in the area and/or sub-area) is estimated. Suitable methods include yield as seen by the last valid remote inspection run, historical records, insurance values of crops in that area/sub-area, expert predictions, and the like. This will lead to factor for loss of commercial value if the AV 400 is not invoked. At block 608, the nature of applications (e.g., type of model) for which the data would be used and desired quality given the cloud density, type and expected duration is collected. This can be derived from maps given by domain experts or by external historical learning systems—and this will lead to application-level loss if local monitoring is not invoked. For example, if a hailstorm hits an area, the storm will be short but severe with a lot of damage, however, the cloud covers will remain much longer, so it may be important to inspect right after the hailstorm and monitor as long as the cloud covers stay, to ensure appropriate loss handling. At block 610, any non-weather factors, such as risk of pest infection from neighboring areas, and the like, are determined.

At block 612, all these collected values are compiled together (e.g., a weighted sum, with weights of each factor being calculated by matching historical yield data, by domain experts, or some combination thereof). At block 614, if this total loss value is above a threshold, a decision is made to perform local inspection at block 616.

Figure 7:
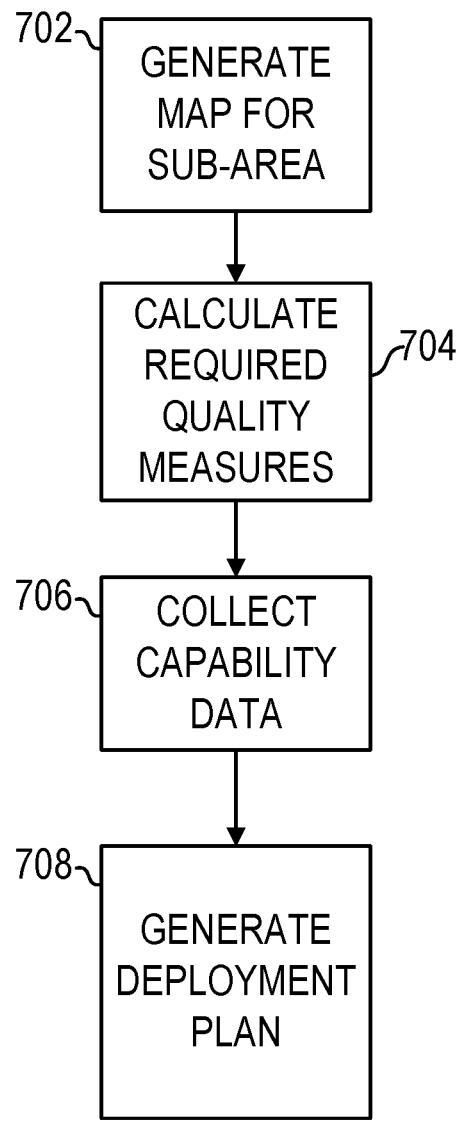
FIG. 7 illustrates a method of deploying a Local Inspection (LI) LI platform to geographic areas, consistent with some embodiments.

FIG. 7 illustrates a method of deploying a LI platform, such as AV 400, to geographic areas, consistent with some embodiments. In some embodiments, this may include selecting a mix of quality and number of AVs 400 to invoke for the given area and/or sub-area. At block 702, for each sub-area identified as being desirable for local inspection, a map is generated consisting of (a) the application type and (b) the commercial value. This block may utilize public data sources, such as Geographic Information System data, as well as proprietary data, such as planting data from the landowners, market price data, market price forecasts, etc. At block 704, data quality requirement is calculated for the sub-area. In some embodiments, these quality measures may include a rate of monitoring desired, an acceptable delay in receiving the resulting data, and a speed and sensor quality of each AV 400 available for a deployment.

Next, at block 708, an AV deployment plan is generated. In some embodiment, the desired data quality (block 704) is mapped onto specific sub-areas (e.g., agricultural fields) of the geographic area. Next, the capabilities of the available AVs (block 706) are used to calculate how much a given AV can cover in that much given time at a given level of data quality i.e., the AV's mapping speed. Based on those two determinations, the base controller (e.g., DPS 300) assigns one or multiple AVs 400 assigned to each agricultural field. If multiple AVs 400 are assigned, then each AV 400 may then be given a 'sub-sub-area' for inspection. Similarly, if one AV 400 can adequately cover more than one sub-area given the requested constraints, that AV 400 may also assigned one or more neighboring sub-areas.

Figure 8:
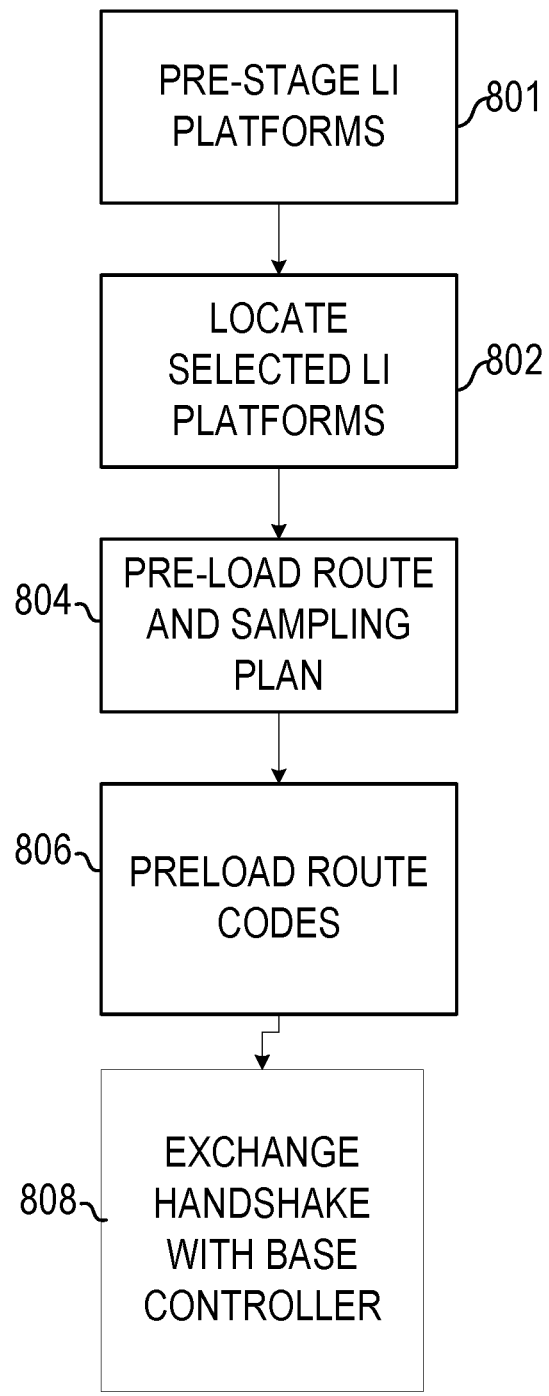
FIG. 8 illustrates a method for pre-loading a LI platform with necessary information to take over inspection from a Remote Inspection (RI) platform, consistent with some embodiments.

In some embodiments, the entries of the map generated at block 702 are considered in a function to decide the optimal quality of AVs e.g., high-flying AVs 400 with high/low camera/sensor resolutions, low-flying AVs 400 that can inspect the ground conditions well. For example, if micro-pest infection risks are high or a detailed analysis of loss due to hailstorm is needed, then the low-flying AVs 400 and the high-resolution AVs 400 with higher flying capabilities are preferred, in spite of the higher cost. However, if none of the applications with such requirements are needed as per the map, then the function will lead to a high-flying AV with relatively higher quality FIG. 8 illustrates a method for pre-loading the LI platform, such as AV 400, with necessary information to take over inspection from the RI platform, consistent with some embodiments. The method begins by pre-staging a large number of AVs 400 of varying capabilities in the geographic area at block 801. These AVs may be permanently staged in the area, or may be temporarily deployed in an area due to seasonal variations, agricultural cycles, enhanced risk of severe weather, etc. At block 802, the AV or AVs 400 selected for deployment are located. At block 804, for each geographical area, sub-area, and/or sub-sub-area that an AV 400 has been chosen for, AV 400 is pre-loaded with route and sampling plan. At block 806, a begin route code, such as an application-based program code related to that area/sub-area/sub-sub-area is created and pre-loaded.

At block 808, if an event is predicted for which local inspection might be warranted, a handshake is carried out between the base controller (e.g., DPS 300) (and indirectly the RI platform) and the AV 400 a threshold time before the predicted event (e.g., cloud cover) arrives in at least one pixel of the geo-area that the AV 400 is supposed to cover. As part of the handshake process, the base controller (e.g., DPS 300) marks data it receives from the remote inspection unit for the geo-area that the AV 400 would cover for possible replacement. In some embodiments, base controller (e.g., DPS 300) would also send data (information) for that area and neighboring areas (up to a threshold distance) to the drone, for processing while the remote inspection remains defunct at block 808. Any applications that the AV 400 would itself run (either all the applications, or controlled by a policy) are identified, and the codes for those are fetched from a code repository either directly by the drone or by the remote inspection unit, and the necessary data is passed over to the drone. In this way, the AVs 400 are ready to handshake with the base controller and to ready to take over their designated geo-area as the event (e.g., clouds) arrive (at block 806).

Figure 9:
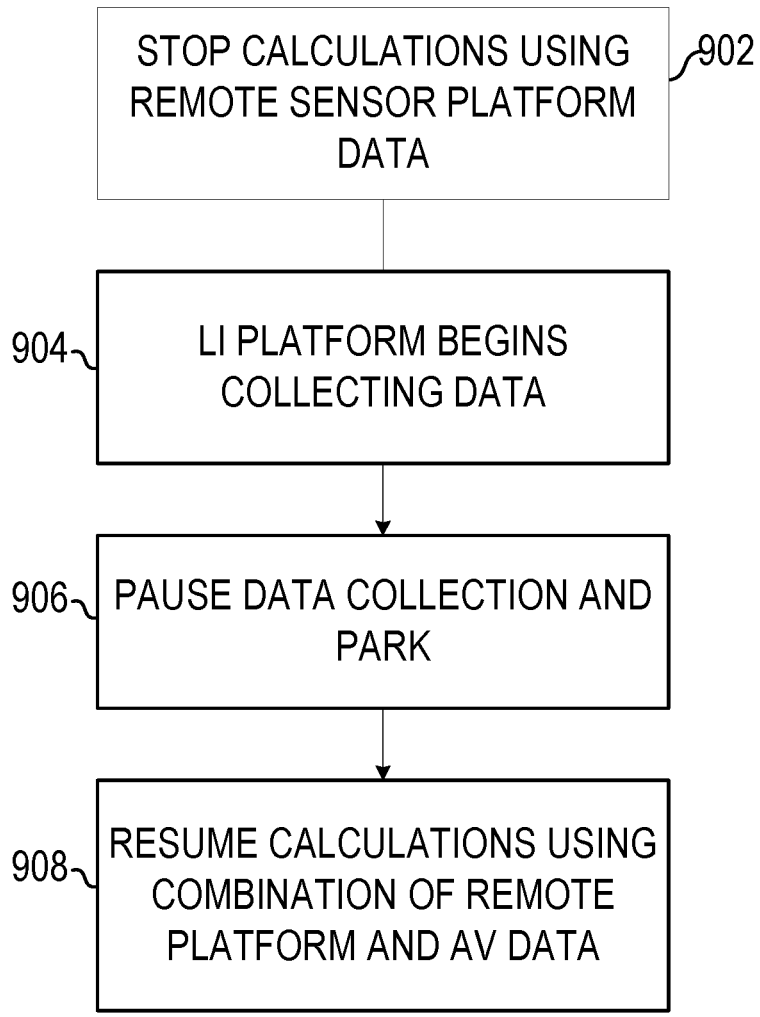
FIG. 9 illustrates a method for enabling monitoring, computing and reporting, consistent with some embodiments.

FIG. 9 illustrates a method for enabling monitoring, computing and reporting, consistent with some embodiments. At block 902, once the LI platforms, such as AVs 400, are pre-loaded (e.g., by the method of FIG. 8), any computation using the remote sensor platform inputs are stopped. At block 904, the AVs 400 now start collecting data and/or performing analysis on the data, as well as moving around for data collection, as the event (e.g., cloud cover) arrives. Optionally, at block 906, in case of sever events, such as heavy storms and hailstorms as per policies, data collection could be paused and the AVs 400 could be parked somewhere safe. Some embodiments may include a preference for local parking, so that the AVs 400 can start as soon as possible after the event is down/over. At block 908, monitoring reports are generated and pushed back to base controller 300, which may be used in real-time or later by the consumers of these reports (such as agriculture companies fertilizer companies, insurance assessment companies, farmers, logistics companies, and so on).

Figure 10:
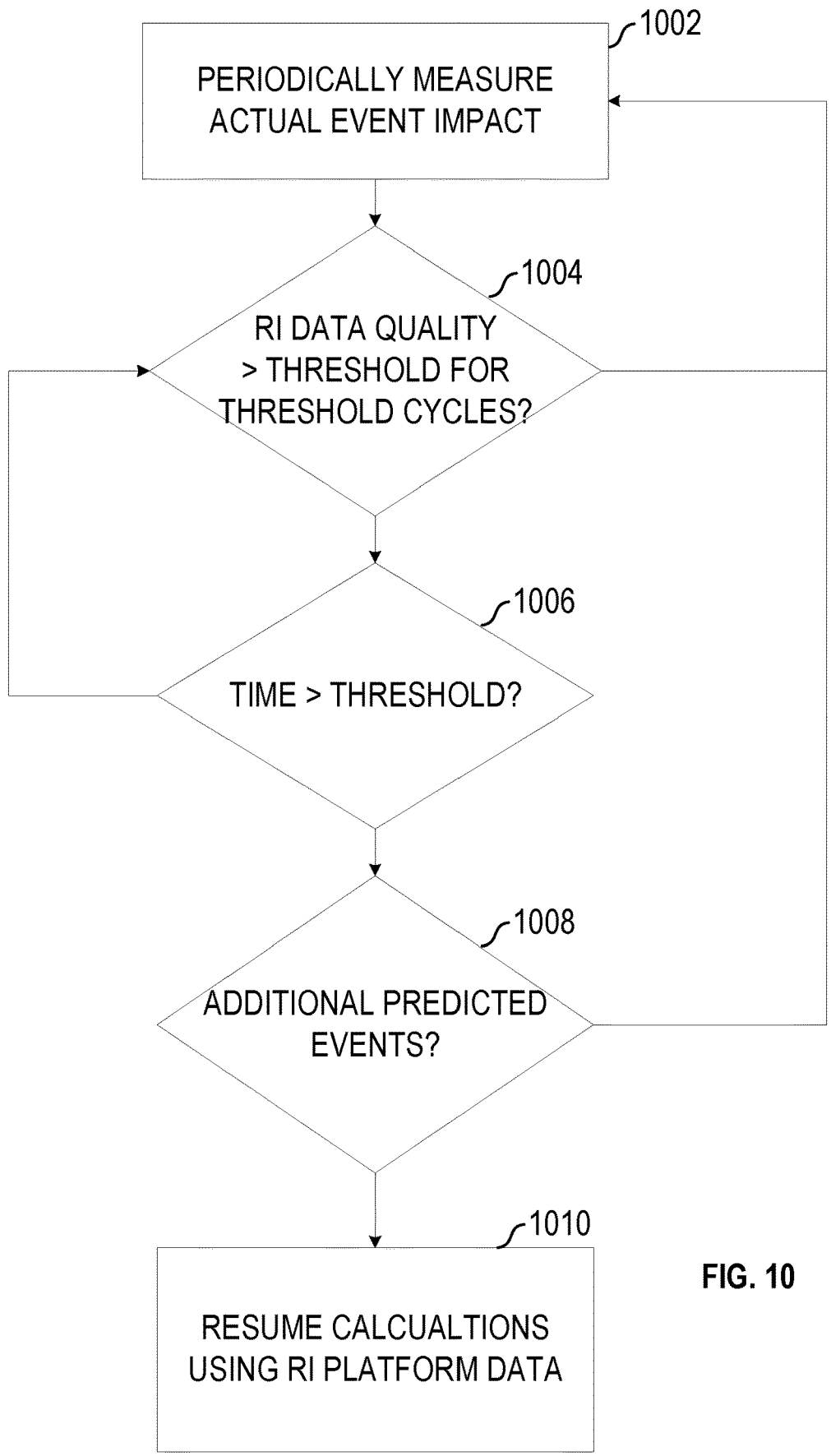
FIG. 10 illustrates a method for passing full control back to the RI platform, consistent with some embodiments.

FIG. 10 illustrates a method for passing full control back to the RI platform, consistent with some embodiments. At block 1002, the impact of the event (e.g., cloud cover) over a broad geographic area is periodically measured. In some embodiments, this sensing can be done by the AVs 400 themselves, by the RI platforms, by querying some public data source, or a combination thereof. At block 1004-1006, a decision module at the base controller (e.g., DPS 300) is executed to determine whether the RI platform can function with sufficient quality/accuracy in the current state of the weather/cloud. One suitable method is to compare a quality measure to a predetermined threshold. If the RI platform is receiving adequate data (block 1002) for a sufficiently large number of cycles keep indicating this (block 1004), and if new/additional events are not predicted to come back to that area within a threshold time duration (1008), then the computations are restarted based upon the RI platform inputs, and the LI platform input based computations are stopped at block 1010. The AV's 400 may then be released Computer Program Product Although the present invention has been described in detail with reference to certain examples thereof, it may be also embodied in other specific forms without departing from the essential spirit or attributes thereof. For example, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for agriculture monitoring, comprising:
   measuring a specified variable over an area of interest using a remote inspection platform according to an inspection plan;
   receiving a prediction of a future occlusion of the remote inspection platform; and
   in response to the predicted future occlusion:
      determining whether to invoke a local inspection platform to complete the inspection plan; and
      generating a deployment plan for the local inspection platform, wherein the deployment plan is based at least in part on predicted conditions of the predicted future occlusion, respective capabilities of the of the local inspection platform, and the monitoring requirements of the inspection plan.

2. The method of claim 1, wherein the local inspection platform comprises a plurality of autonomous vehicles having varying respective capabilities.

3. The method of claim 2, further comprising:
   calculating a number of selected autonomous vehicles of the quality factor required to satisfy the inspection plan.

4. The method of claim 3, wherein the respective capabilities are chosen from the group consisting of a high-flying autonomous vehicle having a high camera resolution and a low-flying autonomous vehicle having a ground condition sensor.

5. The method of claim 2, further comprising:
   pre-staging the plurality of autonomous vehicles having varying respective capabilities in an area of interest of the inspection plan; and
   pre-loading one or more of the plurality of autonomous vehicles with data, states of computation, and code segments from a base station.

6. The method of claim 5, further comprising:
   monitoring the area of interest during the occlusion; and
   reporting measurements to the base station during the occlusion.

7. The method of claim 6, further comprising:
   determining whether the occlusion is sufficiently reduced for the remote inspection platform to restart with sufficient accuracy; and
   return measurement from the autonomous vehicle to the remote inspection platform; and
   return the autonomous vehicles to a home location.

8. The method of claim 2, further comprising:
dividing the area of interest into sub-areas;
calculating a number of autonomous vehicles needed to satisfy the inspection plan for each sub-area; and
assigning the calculated number of autonomous vehicles to each sub-area.

9. The method of claim 8, further comprising, responsive to multiple autonomous vehicles being assigned to a sub-area:
dividing the sub-area into sub-sub-areas;
assigning an autonomous vehicle to each sub-sub-area.

10. The method of claim 8, wherein calculating the number of autonomous vehicles needed to satisfy the inspection plan for each sub-area comprises:
calculating a monitoring rate needed for a time period; and
comparing a mapping speed and a quality of each autonomous vehicle to the calculated monitoring rate to determine a coverage amount for the autonomous vehicle.

11. The method of claim 8, further comprising applying a selection function to compute a quality factor for the autonomous vehicle.

12. The method of claim 8, the deployment plan is further based at least in part on a rate of monitoring desired for each sub-area, an acceptable delay in receiving data from each sub-area, and the respective capabilities of each of the plurality of autonomous vehicles.

13. The method of claim 2, wherein the remote inspection platform comprises a satellite and wherein the autonomous vehicle comprises an aerial autonomous vehicle.

14. The method of claim 1, wherein the received prediction comprises a cloud density and a cloud duration over the area of interest.

15. The method of claim 1, wherein the predicted future occlusion is predicted to interrupt the inspection plan for the remote inspection platform.

16. A base controller for a multi-platform inspection system, comprising a processor coupled to a memory, the memory containing instructions that, when executed on the processor:
initiate an inspection plan using data from a remote inspection platform over an area of interest;
receive a prediction of a future occlusion of the remote inspection platform; and
in response to the predicted future occlusion, automatically deploy one or more of a plurality of local inspection platforms based upon predicted conditions of the predicted future occlusion, respective capabilities of the one or more the plurality of local inspection platforms, and monitoring requirements for the inspection plan.

17. The base controller of claim 16, wherein the remote inspection platform comprises a satellite and wherein the plurality of local inspection platforms comprises a plurality of aerial autonomous vehicles.

18. The base controller of claim 17, further comprising instructions that, when executed on the processor:
divide the area of interest into sub-areas;
calculate a number of aerial autonomous vehicles needed to satisfy the inspection plan for each sub-area; and
assign the calculated number of autonomous vehicles to each sub-area.

19. The base controller of claim 16, wherein the received prediction comprises a cloud density and a cloud duration condition over the area of interest.

20. A computer program product effective agriculture monitoring, the computer program product comprising:
one or more non-transitory computer readable storage media, and program instructions collectively stored on the one or more non-transitory computer readable storage media, the program instructions comprising:
program instructions to measure a desired variable over an area of interest using a remote inspection platform according to an inspection plan;
program instructions to receive a prediction of a future occlusion of the remote inspection platform; and
program instructions to, in response to the predicted future occlusion:
determine whether to invoke a local inspection platform to complete the inspection plan; and
generate a deployment plan for the local inspection platform, wherein the deployment plan is based at least in part on predicted conditions of the predicted future occlusion, respective capabilities of the of the local inspection platform, and the monitoring requirements of the inspection plan.

* * * * *